United States Patent [19]

Kingsley

[11] Patent Number: 5,451,348

[45] Date of Patent: Sep. 19, 1995

[54] VARIABLE LIQUID LEVEL EDUCTOR/IMPELLER GAS-LIQUID MIXING APPARATUS AND PROCESS

[75] Inventor: Jeffrey P. Kingsley, Newburgh, N.Y.

[73] Assignee: Praxair Technology, Inc., Danbury, Conn.

[21] Appl. No.: 228,633

[22] Filed: Apr. 18, 1994

[51] Int. Cl.6 .............................................. B01F 3/04
[52] U.S. Cl. ...................................... 261/36.1; 261/91; 261/93
[58] Field of Search ........................... 261/36.1, 91, 93

[56] References Cited

U.S. PATENT DOCUMENTS

| | | | |
|---|---|---|---|
| Re. 32,562 | 12/1987 | Litz | 261/91 |
| 897,735 | 9/1908 | Goldberg | 261/124 |
| 1,808,956 | 6/1931 | Ketterer | 261/36.1 |
| 3,723,545 | 3/1973 | Nagel et al. | 261/77 |
| 4,000,227 | 12/1976 | Garrett | 261/93 |
| 4,483,826 | 11/1984 | Louthan | 261/36.1 |
| 4,919,849 | 4/1990 | Litz et al. | 261/36.1 |
| 5,004,571 | 4/1991 | Litz et al. | 261/91 |
| 5,009,816 | 4/1991 | Weise et al. | 261/21 |
| 5,244,603 | 9/1993 | Davis | 261/87 |
| 5,350,543 | 9/1994 | Spradley | 261/36.1 |

FOREIGN PATENT DOCUMENTS 1405264 10/1975 United Kingdom .

Primary Examiner—Tim R. Miles
Attorney, Agent, or Firm—Alvin H. Fritschler

[57] ABSTRACT

Apparatus and process for dissolving a gas in a liquid such as a hot edible oil for deodorizing, hydrogenating or other purposes. The invention comprises recirculating the liquid from a closed container, through an eductor and back into the liquid, and connecting the vacuum end of the eductor to the overhead gas space to draw gas down into the liquid. Preferably the apparatus contains an impeller means for sucking gas down from the overhead space, if the liquid is at an operating level.

9 Claims, 1 Drawing Sheet

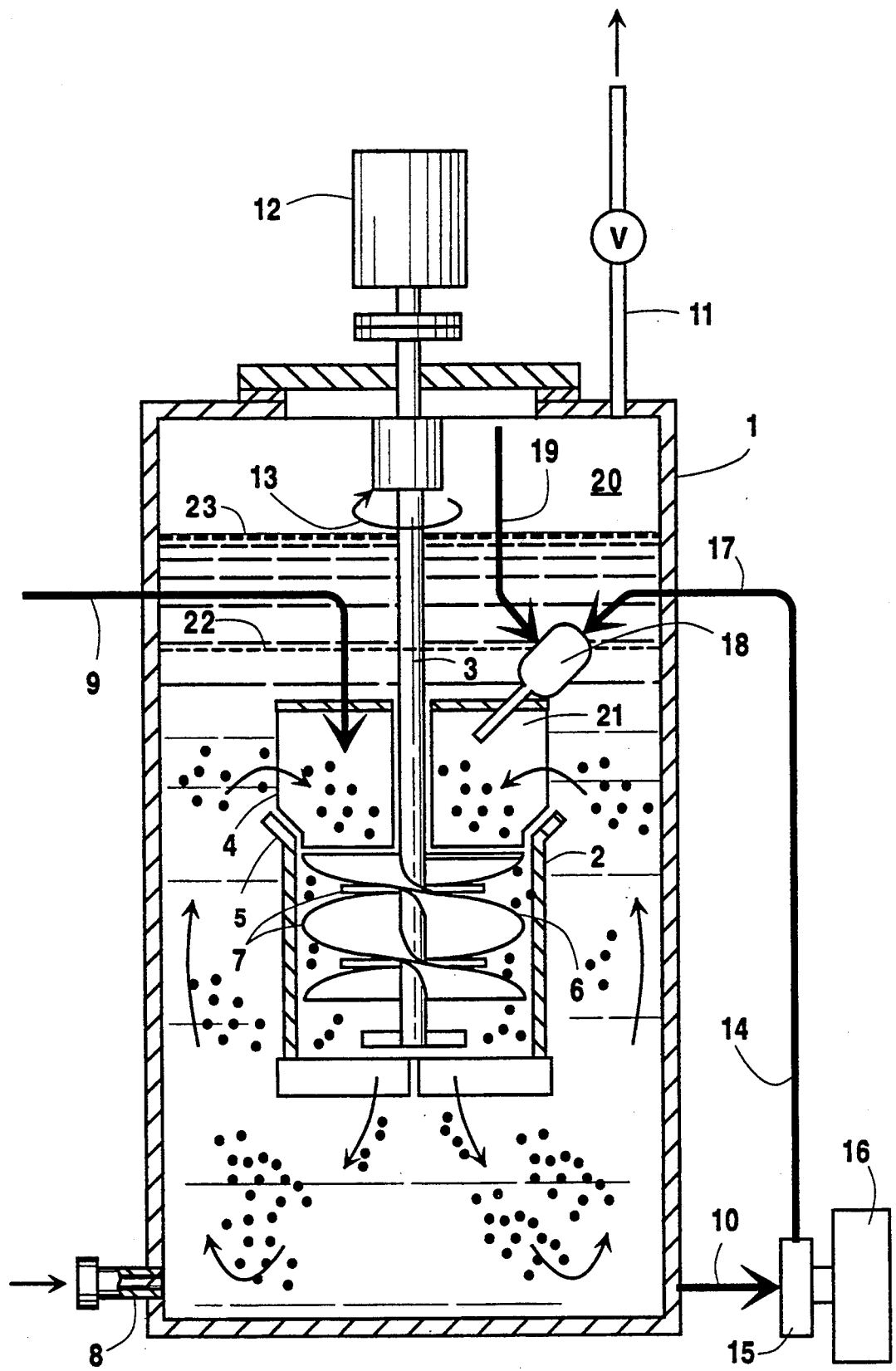

VARIABLE LIQUID LEVEL EDUCTOR/IMPELLER GAS-LIQUID MIXING APPARATUS AND PROCESS

BACKGROUND OF THE INVENTION

1. Field of the Invention

The invention relates to gas-liquid mixing operations. More particularly, it relates to enhanced gas-liquid mixing under particular variable liquid level operating conditions.

2. Description of the Prior Art

In gas-liquid mixing operations, the Advanced Gas Reactor (AGR) system employs a down-pumping impeller positioned within a hollow draft tube to create a recirculating flow pattern in a body of liquid contained in a mixing vessel. Because of such recirculation of the liquid downward in the hollow draft tube, vortices are formed in the upper inlet area of the draft tube to create a suction which draws gas from an overhead gas space within the vessel and mixes it with the recirculating liquid passing downward into the draft tube, as disclosed in commonly-assigned Litz U.S. Pat. No. Re. 32,562.

Satisfactory vortex development for such gas-liquid mixing purposes depends, among various practical operating factors, on maintaining a proper liquid level range above the top of the draft tube. If the liquid level rises above this narrow operating range, the formation of vortices is impeded, and the gas ingestion rate decreases essentially to zero. Thus, operating at liquid levels above the optimum level can substantially reduce the gas ingestion capabilities of the AGR system. Also, if the liquid level falls below the top of the draft tube, all gas suction ceases.

The AGR does not work properly when the liquid level in the reactor is greater than about $\frac{1}{3}$ to $\frac{1}{2}$ draft tube diameter above the draft tube. The impeller becomes liquid flooded such that the vortex entrainment mechanism, which is the primary means for drawing gas into the AGR impeller suction, is effectively cut off. The AGR is not useful for this reason. Variable level applications are common in specialty chemical processing, particularly in hydrogenation and chlorination reactors. Successful adaptation of the AGR for use in the variable level reactors will allow benefits that have been observed in fixed level AGR applications to be realized in the variable level applications.

There are currently three methods concerned with overcoming the problems associated with using the AGR in variable level applications. The first, described in U.S. Pat. No. 5,009,816, uses two or more AGR impeller/draft tube sets placed one above the other. The impellets are mounted on a common shaft. The draft tubes are spaced to allow flow from the bulk liquid into the suction of each impeller. The lowest impeller/draft tube is positioned to operate normally at the lowest operating liquid level. As the liquid level is increased during a batch, the next higher impeller/draft tube set becomes submerged and thereby becomes activated. Thus one of the impeller/draft tube sets is always running at or near the liquid surface, such that the uppermost active impeller/draft tube set in never liquid flooded and the vortex entrainment mechanism of gas ingestion is effective at all liquid levels. The multiple AGR concept described in U.S. Pat. No. 5,009,816 is mechanically complex and expensive to implement. In a second method, described in commonly-owned U.S. Pat. Nos. 4,919,849 and 5,244,603, the AGR impeller shaft is made hollow, and a hold is drilled in the shaft at a position above the maximum liquid level in the reactor. Hollow educator tubes are attached to the shaft in the vicinity of the impeller suction. As the impeller rotates, a negative pressure is generated at the tips of the eductor tubes. The pressure differential between the gas space where the hole is located, and the eductor tips, causes gas to flow from the gas space through the shaft to the impeller suction.

In Litz U.S. Pat. No. 4,919,849, the use of hollow gas ingestion tubes connected to a hollow shaft is disclosed as a means for drawing gas into downward pumping helical impeller means located at non-optimum liquid levels during the course of gas-liquid mixing operations subject to variable liquid level operations. In many gas/liquid mixing applications, particularly those in the specialty chemical and pharmaceutical areas, variations in liquid level within a vessel are very common. They may be caused by variations in the batch size processed, an increase or decrease in the volume of reactants consumed or dissolved, or the addition or removal of material as the reaction proceeds. In many processes, it is desirable to be able to recirculate a gas or gases that accumulate in the vessel head space. This is particularly the case in hydrogenation and oxygenation processes. While the above-indicated Litz U.S. Pat. No. 4,919,849, addresses this matter and provides for the drawing of gas from the overhead gas space in circumstances in which the vortex development of an AGR system, and thus gas ingestion, is impeded, further improvements are desired in the gas-liquid mixing art. In particular, it is desired to provide for enhanced gas-liquid mixing in reactor vessels having very large liquid variations, e.g., as much as 8 feet or more, during the course of gas-liquid mixing operations. The impeller/eductor tube concept of U.S. Pat. Nos. 4,919,849 and 5,244,603 works well as long as the pressure differential generated by the rotating eductor tubes is greater than the liquid head above the eductor tubes. This can be a problem when the liquid level varies widely because the liquid head can be substantial. In the impeller/eductor tube system, the differential pressure which drives gas from the gas space to the impeller suction increases as $N^2$, where N is the rotational speed of the impeller. Thus the range of acceptable operation can be increased by increasing the rotational speed of the impeller. However, impeller power draw increases approximately as $N^3$. At high liquid level, high rotational speed is required to overcome the liquid head, so power draw can be excessive. Furthermore, when the liquid head is high, the required rotational speed can approach the impellet's critical speed, which can cause severe vibration and increases the likelihood of mechanical problems.

Another method for overcoming the problems associated with variable level applications, described in commonly-owned U.S. Pat. No. 5,004,571, uses an external surge tank and level control to maintain the liquid level in the reactor vessel at or near the optimum level for conventional AGR operation. The primary mechanism of gas dispersion is by vortex entrainment of the gas from the gas space into the impeller suction.

The external surge tank method requires controls to maintain the optimum operating liquid level, an additional pressure vessel, and pressure and level controls. Thus the system is complex and expensive.

SUMMARY OF THE INVENTION

The present invention provides a novel gas-liquid mixing apparatus, such as an Advanced Gas Reactor (AGR), which includes an external liquid-recirculation pump and conduit, and an internal venturi ejector pump or eductor having a liquid inlet communicating with said recirculation conduit, and having a vacuum inlet communicating through a gas inlet conduit or suction tube with the gas space of the apparatus. The eductor receives a continuous flow of liquid from the recirculation conduit, forced therethrough by the external pump, and discharges it through the eductor to the suction end of the impeller of the AGR. This produces a vacuum pressure, through the suction tube, which draws gas from the gas space into the eductor and into the recirculating liquid for discharge as a gas-liquid mixture from the eductor nozzle into the vicinity of the inlet end of the impeller, independently of the liquid level in the apparatus and independently of the speed of rotation of the impeller.

THE DRAWING

The accompanying drawing is a schematic side elevation view of a variable level gas-liquid mixing system, such as an AGR system in which the overhead gas ingestion mechanism is independent of the impeller and variations in the liquid level.

DETAILED DESCRIPTION

Referring to the drawing, vessel 1 is a container having an impeller shaft tube 2 vertically disposed herein. The system is closed or sealed to contain the working gas within the overhead space. Draft tube 2 extends from above the upper end of helical impeller 6 to a point substantially above the floor of vessel 1, thus providing adequate room for liquid circulation. The top portion of draft tube 2 comprises a flared conical inlet 5, the outside wall of which, forms an obtuse angle of about 145 to about 175 degrees with the outside vertical wall of draft tube 2. From about 2 to 8 vertical inlet guide baffles 4 are inserted in conical inlet 5, the baffles being thin sheets of structurally rigid material. Preferably they are equilaterally spaced symmetrically positioned around conical inlet 5. The impeller 6 comprises turbulence promoter blades 7 affixed to the impeller shaft 3 for rotation with the shaft 3 by the motor 12.

During operation, at least a minimum liquid level 22 is maintained above conical inlet 5. Appropriate liquid and gas inlets, 8 and 9, and an upper pressure relief vent 11 are provided, as well as structural support for vessel 1 and draft tube 2. A motor 12 is provided at the top of the vessel 1 to drive the impeller shaft 3 in the clockwise direction of arrow 13. The working gas is introduced under pressure through the inlet conduit 9 which discharges the gas below the liquid level into the inlet or suction end of the draft tube 2. Typical gas pressures are in the range of about 0.1 psig (pounds per square inch gauge) to about 2000 psig and typical gas flow rates are in the range of about 1 scfm (standard cubic feet per minute) to about 1000 scfm. The liquid is introduced, and eventually withdrawn, at inlet 8, near the base of the sidewall of vessel 1. Typical liquid flow rates are in the range of about 2 to about 10,000 gallons per minute.

As an essential distinction over prior known systems, the present system incorporates a means for continuously recirculating the liquid being treated to an eductor means 18 which employs the force of the recirculating liquid to create a vacuum which is communicated with the gas space above the liquid level in the vessel. This vacuum draws gas from the gas space into the eductor and into the flow of recirculating liquid to form a gas-liquid mixture which is discharged into the inlet end of the draft tube 2 in the area of the suction end of the impeller 6. In addition, the continuous supply of the working gas is introduced to the vessel 1 through the gas inlet conduit 9 directly into the liquid at the inlet end of the draft tube 2 in the area of the suction end of the impeller 6. Thus, gas ingestion is made independent of the speed of operation of the impeller 6, and can be controlled to optimize processing conditions over a wide range variation in the liquid level between a minimum level 22 and a maximum level 23, shown in the drawing.

Referring to the drawing which illustrates a suitable means for recirculating the liquid, a sidestream recirculation conduit 14 comprises a lower liquid outlet conduit section 10, a pump 15 driven by an external motor 16, an upper liquid inlet conduit section 17 and a conventional liquid-operated vacuum injector pump or eductor 18 having a suction tube 19 communicating between the vacuum chamber of the eductor 18 and the gas space 20 above the liquid level within the vessel 1. The vacuum injector pump or eductor 18 has a diverging nozzle section 21 which is directed down into the inlet end of the draft tube 2 to decelerate and discharge the mixture of the recirculating liquid and the gas aspirated from the gas space 20, through tube 19, down into the impeller 6, together with new gas introduced to said area through the gas inlet conduit 9.

It should be noted that the primary means for accomplishing gas-liquid mixing in this invention is the impeller and draft tube configuration which are described U.S. Pat. Nos. 4,328,175 and 4,454,077. However, according to the present invention the range of liquid levels over which the impeller is effective is extended by using a sidestream liquid-recirculation through conduit 14 to drive an eductor 18 and create a vacuum which draws gas from the gas space 20, through the eductor 18 and into the impeller suction.

The principles of eductor or vacuum injector pump operation are well known. A motive fluid, in this case a sidestream of reaction liquor, is accelerated through a internal venturi nozzle which opens to a vacuum chamber. The latter is connected by suction tube 19 to the gas space 20. The high velocity of the liquid jet through the eductor 18 creates a vacuum by the Bernoulli effect. Thus, gas is drawn down from the gas space 20 above the liquid into the vacuum chamber of the eductor 18 where it mixes intimately with the liquid. Gas-liquid contact and mass transfer from the gas to the liquid phase occur in the vacuum chamber. The gas-liquid jet entrains and mixes in additional fluid from the bulk liquid as its exits the nozzle 21. The eductor 18 is positioned so that the gas-liquid jet is directed into the impeller suction. One or more eductors can be fed by the sidestream to move the required amount of gas from the gas space to the impeller suction.

The gas-moving capability of eductors decreases with liquid depth. However, the gas flow can be maintained or adjusted as desired by increasing the flow rate of the recirculating liquid. Since the pump 15 is independent of the impeller drive 12, this is relatively easy to do in the present eductor/pump configuration. The pump 15 can be sized to deliver enough liquid to the eductor 18 to draw gas at the maximum differential head. The liquid flow can be regulated using a valve or the flow can be permanently set at the maximum rate, as desired.

As an example, for the hydrogenation of an undistilled tallow fatty acid in a 6000 gallon reactor vessel operated at 400° F. and 300 psig, the total hydrogen consumption is 40,000 SCFH but the peak instantaneous rate of consumption is 80,000 standard cubic feet per hour. The peak requirement of gas can be delivered with a total liquid flow of 80 gallons per minute supplied through the recirculation conduit 14 at 20 psi above the discharge pressure of the eductor 18. A 60% efficient 2 Hp pump 15 would be required.

High efficiency eductors, where efficiency is defined as high gas flow per unit liquid flow, can be used when the liquid level variation is low. Less efficient eductors are available for applications where a liquid level variation is substantial.

In summary, the liquid material being treated, such as edible oils being ingested with nitrogen gas to displace oxygen and deodorize the oils, or high boiling liquids being oxidized, hydrogenated, or otherwise reacted with gases, is introduced to the vessel 1 through liquid inlet outlet 8 to fill the vessel 1 to a liquid level which may vary between a minimum level 22 and a maximum level 23, both have the inlet end of the draft tube 2.

Feed gas is introduced through gas inlet conduit 9 directly into the liquid at the inlet area of the draft tube 2 and the suction area of the impeller 6, and is drawn downwardly and agitated by the impeller action, as a mixture with the liquid, to accomplish the desired action or reaction. The rate of introduction of the feed gas is dependent upon the particular system, e.g., whether the feed gas is consumed by reaction with the liquid, dissolved therein, or escapes in large volumes up to the gas space 20 above the liquid level.

In summary, to minimize the rate of feed gas introduction the in-situ gas from the upper gas space 20 is recirculated back down through the liquid by the eductor 18 which aspirates the gas from the gas space 20 down through the suction tube 19 and eductor 18 into the suction of the impeller 6, to increase the effectiveness of the system. The eductor is powered by fluid flow, recirculated from the vessel 1, through outlet section 10 and forced through liquid recirculation conduit 18 and section 17 by pump 15. The acceleration of the liquid through the eductor 18 creates a Bernouli-effect vacuum within a chamber of the eductor 18 which is open to the suction tube 19. A variable speed motor 16 controls the operation of the pump 15 to regulate the vacuum within the eductor 18 and thereby regulate the rate at which the overhead gas from space 20 is withdrawn through the suction tube 19, mixed with the recirculating liquid in the eductor 18 and ejected into the suction end of the impeller 6.

As is apparent from the foregoing, the recirculation of the gas from the overhead gas space 20 is independent of variations in the liquid level, between a minimum level 22, above the entrance to the draft tube 2, and a maximum level 23, below the inlet of the suction tube 19, and is also independent of the speed of operation of the impeller 6.

The selection of a particular liquid-operated eductor will depend upon the vacuum flow requirements of the particular system being used, i.e., the size or volume of the vessel, the volume of the liquid being treated and the rate of consumption of the gas. Liquid-operated "Vacuum Transducer" eductors of various capacities are commercially-available from Air-Vac Engineering Company, Inc., Milford, Conn.

It should be understood that the foregoing description is only illustrative of the invention. Various alternatives and modifications can be devised by those skilled in the art without departing from the invention. Accordingly, the present invention is intended to embrace all such alternatives, modifications variances which fall within the scope of the appended claims.

What is claimed is:

1. A process for mixing a gas and a liquid within a closed container having an overhead gas space comprising the steps of:
   (a) filling the container with liquid to a predetermined liquid level, leaving gas space overhead;
   (b) adding and mixing a gas supply with said liquid to produce a predetermined interaction therebetween, a portion of said added gas escaping into the overhead gas space;
   (c) circulating the liquid in the container by impeller means positioned in the container, such as to create a suction that draws gas down from the overhead gas space and mixes it with the recirculating liquid, provided that the liquid level is within a predetermined level range;
   (d) continuously recirculating a portion of said liquid through a liquid-operated eductor which discharges said portion back into said liquid, below the surface level thereof, to create a vacuum within said eductor,
   (e) communicating said vacuum with the overhead gas space to aspirate gas from said space down into said eductor where it mixes and discharges with the recirculating liquid below the liquid level in the container, and
   (f) adjusting the rate of liquid recirculation through said eductor to control the rate of aspiration of the overhead gas.

2. A process according to claim 1 which comprises surrounding the impeller means by a draft tube which extends from below the liquid level to above the bottom of the container to enhance the liquid circulation and suction created by the impeller means.

3. A process according to claim 1 which comprises discharging the gas/liquid mixture from the eductor directly into the suction created by the impeller means.

4. A process according to claim 1 in which the gas supply added to the container and mixed with the liquid therein is bubbled into the liquid within the influence of the suction created by the impeller means.

5. A process for mixing a gas and a liquid, which is subject to change in liquid levels during the mixing operation, in a mixing vessel having a hollow draft tube with an axial flow, down-pumping impeller means positioned therein for vortex development and the ingestion of gas from an overhead gas space within the mixing vessel into the body of liquid therein, comprising:
   (a) rotating said impeller means to create a liquid recirculation flow pattern within the mixing vessel, with liquid passing downward inside the draft tube and upward in the annular space between said draft tube and the walls of the mixing vessel, so as to develop a vortex and to draw gas from the overhead gas space by gas ingestion at an operating liquid level within the mixing vessel; and
   (b) recirculating liquid from said mixing vessel through an eductor having a vacuum chamber and a discharge nozzle;

(c) communicating said vacuum chamber with said overhead gas space, and communicating said discharge nozzle with the entrance of said draft tube, said liquid recirculation creating a vacuum which draws gas from said overhead gas space into said eductor, mixes it with the recirculating liquid and discharges the mixture into the entrance of the draft tube, whereby said gas is mixed with said liquid independently of the liquid level and of the speed of the impeller, and the liquid level is maintained at an operating level of the impeller means.

6. An apparatus for dissolving a gas in a liquid, comprising a closed container for receiving a liquid to a predetermined level to leave an overhead gas space; means for adding and mixing a gas supply with said liquid to produce a predetermined gas liquid interaction, a portion of said added gas escaping from the liquid into the overhead gas space; impeller means having a suction inlet for drawing gas down from the overhead gas space and mixing it with the liquid provided that the liquid level is within an operating range; means for recirculating a portion of the liquid through a liquid-operated eductor having a vacuum chamber and a discharge nozzle which exits below the liquid level; a suction tube communicating between the vacuum chamber of the eductor and the overhead gas space, for drawing gas from the gas space into the eductor under the influence of the recirculation flow through the eductor, to produce a gas/liquid mixture and discharge it into the liquid independently of the level of the liquid within the container and means for regulating the rate of recirculation of the liquid through the eductor and the rate at which gas is drawn from the overhead gas space.

7. An apparatus according to claim 6 in which said impeller means include a draft tube which surrounds the impeller and extends from below the liquid level to above the bottom of the container and enhances the liquid circulation and suction created by the impeller means.

8. An apparatus according to claim 6 in which said gas supply means comprises a conduit which opens into the area of the suction inlet of the impeller means for supplying gas directly into the liquid for admixture by the impeller means.

9. An apparatus for mixing a gas and a liquid which is subject to change in liquid levels during the mixing operation comprising:

(a) a mixing vessel having a hollow draft tube with an axial flow, down-pumping impeller means positioned therein and capable of creating a circulation flow pattern within the mixing vessel, with liquid being passed downward inside the draft tube and upward in the annular space between the draft tube and the walls of the mixing vessel, thereby developing a vortex and drawing gas from the overhead gas space within the mixing vessel provided that the liquid is at an operating liquid level within said mixing vessel, and (b) a liquid recirculation system comprising a conduit having an outlet section withdrawing liquid from a lower area of said vessel and an inlet section for reintroducing said liquid at an upper area of said vessel, pump means for pumping the liquid through said conduit, and an eductor connected to the inlet section of said conduit, said eductor having an inlet for receiving a continuous supply of said recirculating liquid, a converging-diverging nozzle having a restricted throat for increasing the velocity of said liquid, a vacuum chamber associated with said restricted throat, and a discharge nozzle below the liquid level in the vessel and opening into the entrance of the impeller draft tube, and a suction tube communicating between the vacuum chamber of the eductor and the overhead gas space, whereby vacuum in the vacuum chamber of the eductor draws gas from the overhead gas space through the suction tube, for mixing with the recirculating liquid in the eductor and for discharge into the entrance of the impeller draft tube.

* * * * *